UNITED STATES PATENT OFFICE.

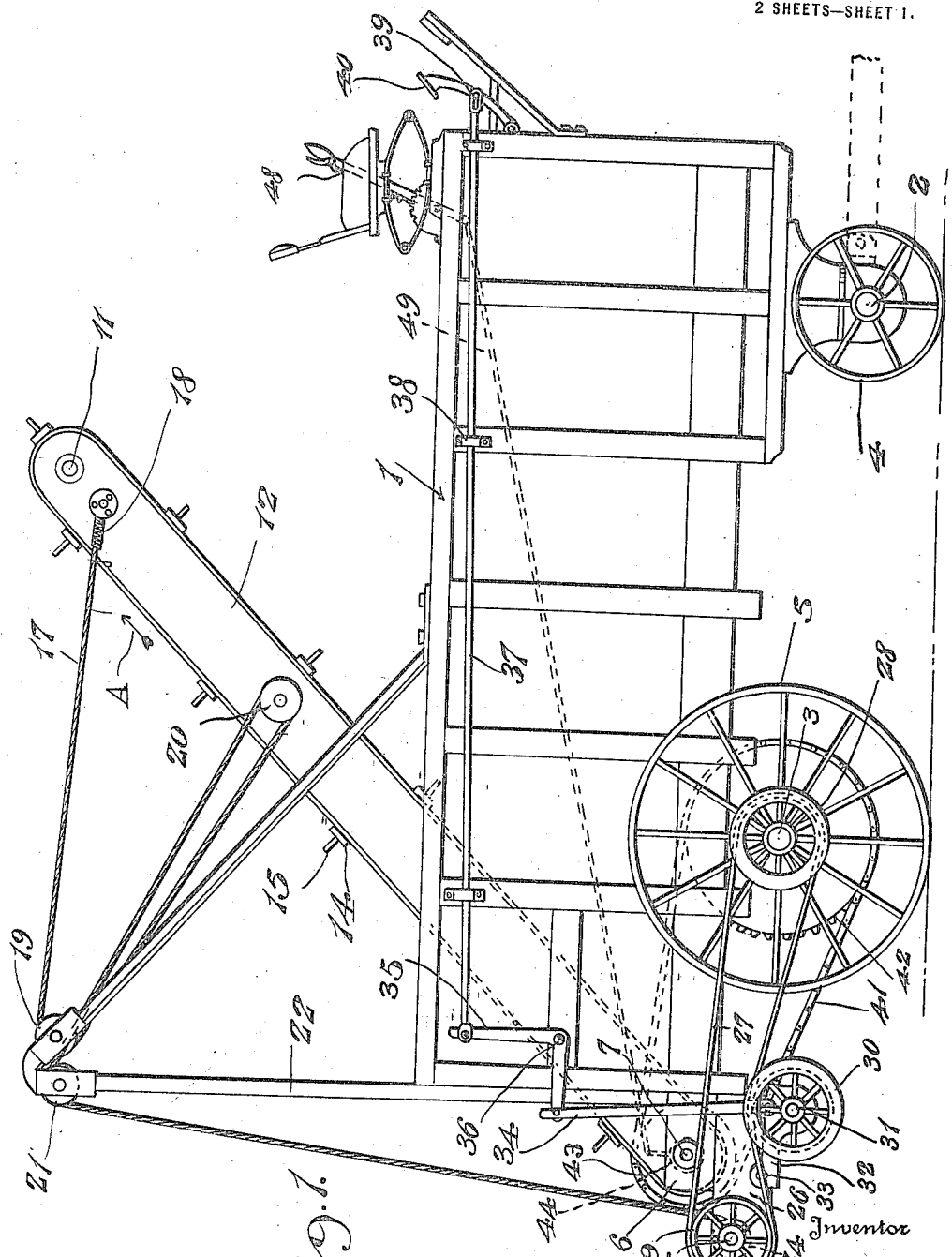

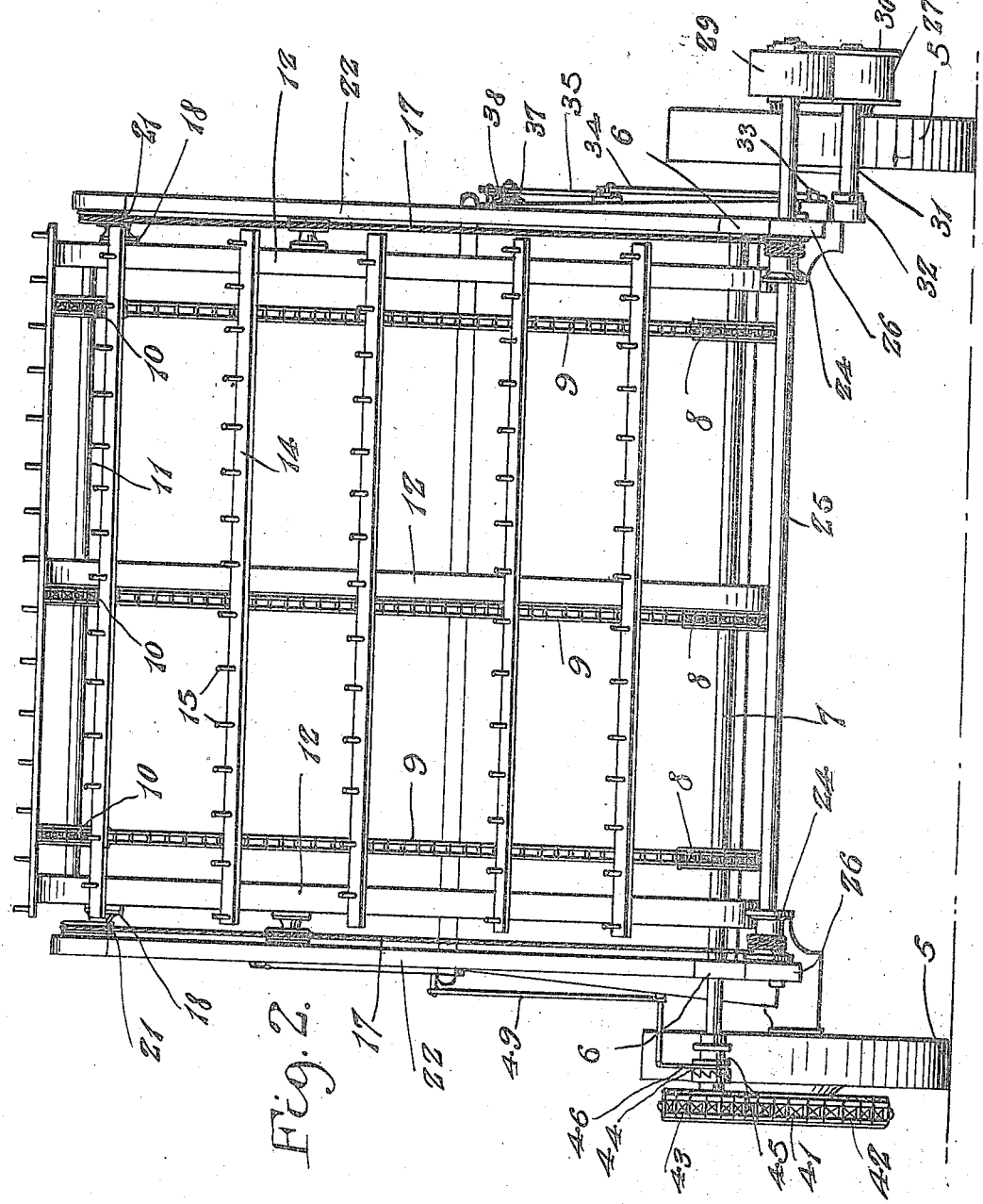

JOHN B. ELLIOTT, OF WICHITA, KANSAS.

STRAW AND MANURE SPREADER.

1,180,988.  Specification of Letters Patent.  Patented Apr. 25, 1916.

Application filed August 30, 1915. Serial No. 48,137.

*To all whom it may concern:*

Be it known that I, JOHN B. ELLIOTT, a citizen of the United States, residing at Wichita, in the county of Sedgwick and State of Kansas, have invented certain new and useful Improvements in Straw and Manure Spreaders; and I do hereby declare the following to be a full, clear, and exact description of the invention, such as will enable others skilled in the art to which it appertains to make and use the same.

This invention relates to a straw and manure spreader, and the primary object of the invention is to provide a spreading structure which may be attached to any ordinary type of wagon bed, which spreader structure is operated by the travel of the wagon, for efficiently spreading the manure or straw over the surface of a field.

Another object of the invention is to provide straw or manure spreading means which will engage the top of the load of straw or manure, and remove the manure from the top of the load for spreading instead of from the bottom of the load as is ordinary in manure spreaders commonly in use.

A further object of this invention is to provide means operable by the travel of the spreader for raising or lowering the manure spreading means for increasing or decreasing the quantity of manure spread over a field.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views and in which:—

Figure 1 is a side elevation of the improved manure spreader, and Fig. 2 is a rear elevation of the spreader.

Referring more particularly to the drawings, 1 designates the manure retaining bed, which may be specially constructed, or which may be any desired type of wagon bed commonly in use. The wagon or manure retaining structure 1 has front and rear axles 2 and 3 supported thereby, as is ordinary, upon which axles are mounted supporting wheels 4 and 5.

An extension 6 extends rearwardly from the rear ends of the sides of the wagon or manure retaining bed 1 and they rotatably support a shaft 7, upon which is mounted a plurality of sprocket wheels 8. Sprocket chains 9 travel about the sprocket 8 and about sprockets 10 which are mounted on a shaft 11. The shaft 11 is rotatably supported by side bars or plates 12, which have their lower ends pivotally mounted upon the shaft 7. Slats 14 are attached to the sprocket chains 9 at spaced intervals thereabout, and the slats 14 have manure engaging fingers 15 attached thereto and projecting outwardly from their outer surface. The fingers 15 are spaced longitudinally of the slats 14 and are arranged for efficiently removing all the manure from the bed 1.

The side boards 12 of the spreader supporting frame structure have cables 17 connected thereto adjacent to their upper ends, as is shown at 18. The cables extend about pulleys 19 downwardly to and about sheave pulleys 20 which are attached to the side boards 12 intermediate of their ends. From the pulleys 20, the cables extend upwardly and over other sheave pulleys 21. The pulleys 19 and 21 are supported by standards 22 which are attached to and extend upwardly from the rear end of the bed 1. After passing over the pulleys 21, the cables 17 extend downwardly and are coiled about or wound upon drums 24. The drums 24 are mounted upon a shaft 25, which extends across the rear end of the bed 1 and is rotatably supported by suitable supporting arms 26 which project rearwardly from the rear end of the bed 1. The shaft 25 is rotated by the travel of the manure spreader, through the medium of a belt 27 which travels about a pulley 28 which is attached to one of the rear supporting wheels 5, and about a pulley 29 which is mounted upon the shaft 25. An idler 30 engages the belt 27. The idler 30 is rotatably mounted upon a stub shaft 31, which stub shaft is supported by a block 32. The block 32 is pivotally connected as is shown at 33 to one of the supporting arms or brackets 26. A bar 34 is connected to the block 32 and extends upwardly therefrom, having its upper end connected to a bell crank 35 which is pivotally supported at 36 by the manure retaining bed 1. A rod 37 is connected to the bell crank 35 and is slidably supported along side the bed 1 by suitable brackets 38. The forward end of the rod 37 is connected by means of a slot and pin connection as illustrated at 39 to a foot lever 40 so that when it is desired to raise the spreader structure, the foot lever 40 is operated, for moving the idler 30 into engagement with the belt 27 which will tighten the belt and rotate the pulley 29 and the shaft 25 by the rotation of the rear axle 3 of the supporting wheel 5, which will wind the cables 17 upon the drums 24 and raise the spreader structure. When it is desired to lower the spreader structure, the foot lever 40 is released, which will permit the spreader structure to drop by its own weight.

The shaft 7, is rotated for operating the spreader conveyer which is composed of the sprocket chains 9 and flights 14, through the medium of a sprocket chain 41 which travels about a sprocket 42, and about a sprocket 43. The sprocket 43 is mounted upon the shaft 7, while the sprocket 42 is connected to one of the rear supporting wheels 5 for synchronous rotation therewith. The sprocket 43 is loosely mounted upon the shaft 7 and it has a clutch segment 44 formed upon the inner end of the innermost hub section. The clutch segment 44 coacts with a clutch segment 45, which is feathered upon the shaft 7. A forked arm 46 engages the segment 47 and is connected to a hand lever 48, in the usual manner, such as by rods, indicated at 49 so that when the hand lever 48 is rocked, the clutch segment 45 will be moved longitudinally on the shaft 7 for moving it into or out of engagement 44 for rotating the shaft by the rotation of the sprocket 43. If it is so desired a hand lever may be employed in lieu of the foot lever 40 without departing from the spirit of this invention.

In the operation of the improved straw and manure spreader: when the retaining bed 1 is first filled with the manure or straw the conveyer structure is elevated to substantially a perpendicular position which will permit the thorough filling of the retaining bed 1. After the bed 1 has been filled with the straw or manure, and it is desired to spread the same over a field, the conveyer or spreader structure is permitted to fall until it engages the top of the loaded straw or manure. The clutch segment 45 is then operated for rotating the shaft 7 and operating the spreading conveyer structure. The spreading conveyer travels in the direction indicated by the arrow A in Fig. 1 of the drawings, so that it will rake the manure or straw off the top of the load and carry it rearwardly and scatter it in the rear of the spreader during its travel over a field. By operating the foot lever 40, the position of the spreader conveyer may be regulated as desired for scattering either a relatively great or small quantity of manure or straw over the surface of the field.

From the foregoing description taken in connection with the accompanying drawings the advantages of construction and of the method of operation of the improved straw and manure spreader will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a manure spreader structure, the combination, with a manure retaining bed, a shaft rotatably supported rearwardly of said rear end of said bed, a conveyer supporting frame pivotally mounted upon said shaft, a conveyer for travel within said frame and adapted for having its lower portion traveling in the direction opposite to the travel of the manure spreader for engaging the top of a load of manure retained by the bed and carrying it rearwardly for deposit rearwardly of the retaining bed. standards carried by the rear end of said bed, a plurality of pulleys carried by said standards and said conveyer supporting frame, cables passing over said pulleys, a shaft rotatably supported rearwardly of said retaining bed, drums mounted upon said shaft, said cables connected to said drums for winding thereon for raising said conveyer and conveyer supporting frame, and means for rotating said last named shaft by the travel of said supporting frame.

In testimony whereof I affix my signature in presence of two witnesses.

JOHN B. ELLIOTT.

Witnesses:
J. R. H. KING,
O. J. DUNN.

Copies of this patent may be obtained for five cents each, by addressing the "Commissioner of Patents, Washington, D. C."